United States Patent
O'Neill et al.

(10) Patent No.: US 9,318,759 B2
(45) Date of Patent: Apr. 19, 2016

(54) FUEL CELL ASSEMBLY AND METHOD OF CONTROL

(75) Inventors: Jonathan O'Neill, Manchester, CT (US); Timothy W. Patterson, West Hartford, CT (US)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/363,567

(22) PCT Filed: Dec. 9, 2011

(86) PCT No.: PCT/US2011/064051
§ 371 (c)(1),
(2), (4) Date: Jun. 6, 2014

(87) PCT Pub. No.: WO2013/085530
PCT Pub. Date: Jun. 13, 2013

(65) Prior Publication Data
US 2014/0349201 A1 Nov. 27, 2014

(51) Int. Cl.
*H01M 8/04* (2006.01)
*H01M 16/00* (2006.01)

(52) U.S. Cl.
CPC ........ *H01M 8/04619* (2013.01); *H01M 8/0438* (2013.01); *H01M 8/0485* (2013.01); *H01M 8/0488* (2013.01); *H01M 8/0494* (2013.01); *H01M 8/04365* (2013.01); *H01M 8/04529* (2013.01); *H01M 8/04559* (2013.01); *H01M 8/04611* (2013.01); *H01M 8/04731* (2013.01); *H01M 8/04753* (2013.01); *H01M 8/04828* (2013.01); *H01M 16/003* (2013.01); *H01M 16/006* (2013.01); *H01M 2250/402* (2013.01); *Y02B 90/12* (2013.01); *Y02E 60/50* (2013.01)

(58) Field of Classification Search
CPC ..................... H01M 8/04753; H01M 8/04619; H01M 8/04746
See application file for complete search history.

(56) References Cited

U.S. PATENT DOCUMENTS

| | | | |
|---|---|---|---|
| 2001/0051290 A1 | 12/2001 | Kashiwagi | |
| 2002/0182467 A1* | 12/2002 | Ballantine et al. | 429/26 |
| 2003/0022034 A1 | 1/2003 | Suzuki | |

(Continued)

FOREIGN PATENT DOCUMENTS

| | | |
|---|---|---|
| JP | 2001325976 A | 11/2001 |
| JP | 2003036871 A | 2/2003 |
| JP | 2004-265862 A | 9/2004 |
| JP | 2006/32169 A | 2/2006 |

(Continued)

OTHER PUBLICATIONS

Machine translation of JP2006-202683. printed Jan. 9, 2015.*

*Primary Examiner* — Maria J Laios
(74) *Attorney, Agent, or Firm* — Seed IP Law Group PLLC

(57) ABSTRACT

An exemplary method includes of operating a fuel cell at a first power output level that includes a plurality of operation parameters. Each operation parameter has a value to satisfy a first power demand. A change between the first power demand and a second power demand is determined. At least a first one of the operation parameters is maintained at a value corresponding to the first power output level or at an intermediate value while at least a second one of the operation parameters is changed to a value corresponding to a second power output level to satisfy the second power demand. The first operation parameter is delayed from changing to a value corresponding to the second power output level until a predetermined criterion is met.

23 Claims, 2 Drawing Sheets

(56) References Cited

U.S. PATENT DOCUMENTS

| | | |
|---|---|---|
| 2003/0106726 A1 | 6/2003 | Yoshii |
| 2003/0194589 A1 | 10/2003 | Pratt et al. |
| 2005/0164048 A1 | 7/2005 | Wheat et al. |
| 2005/0227125 A1* | 10/2005 | Shaffer et al. ............... 429/13 |
| 2009/0011302 A1 | 1/2009 | Hamada |
| 2009/0162712 A1 | 6/2009 | Yagi et al. |
| 2010/0112402 A1 | 5/2010 | Ogawa |
| 2011/0014536 A1 | 1/2011 | Yoshida |
| 2011/0059375 A1 | 3/2011 | Buechi et al. |
| 2011/0086286 A1 | 4/2011 | Ganapathy et al. |
| 2012/0028138 A1 | 2/2012 | Lee et al. |
| 2012/0225329 A1 | 9/2012 | Kazuno et al. |
| 2013/0065091 A1 | 3/2013 | Ishikawa et al. |

FOREIGN PATENT DOCUMENTS

| | | |
|---|---|---|
| JP | 2006-202718 A | 8/2006 |
| JP | 2006202683 A | 8/2006 |
| JP | 2006/302791 A | 11/2006 |
| JP | 2007-5171 A | 1/2007 |
| JP | 2007-128790 A | 5/2007 |
| JP | 2007-220462 A | 8/2007 |
| JP | 2009-158202 A | 7/2009 |
| JP | 2009-231223 A | 10/2009 |
| JP | 2011-520228 A | 7/2011 |
| JP | 2011-210501 A | 10/2011 |
| JP | 2011-222281 A | 11/2011 |
| JP | 2012-185971 A | 9/2012 |
| WO | 2006/069070 A2 | 6/2006 |
| WO | 2008/007690 A1 | 1/2008 |

* cited by examiner

FUEL CELL ASSEMBLY AND METHOD OF CONTROL

BACKGROUND

Typical fuel cell arrangements include multiple fuel cells placed together in a cell stack assembly (CSA). A cathode reactant gas, such as air, and an anode reactant gas, such as hydrogen, are used in an electro-chemical reaction to produce electrical energy. Humidified membranes may separate the anode reactant from the cathode reactant, and conduct ionic current between anode and cathode. A controller monitors operation parameters of the CSA and controls the flow of the anode and cathode reactant gases and the electrical current or voltage to produce a desired CSA power output level.

There are times when the desired power output from the CSA varies. This can be in response to a change in load or power demand. It may also be a result of a change in fuel cell operation such as a transition from startup to normal operation.

CSA durability can be limited by decay mechanisms associated with cyclic operation. For example, voltage cycling may cause performance decay over time. Local membrane humidity cycling may cause the membrane to wear out. Both of these types of cycling may occur in response to changes in load or power demand. While such cycling may result in only modest decay or wearout rates at lower temperatures, the negative effects associated with such cycling is exacerbated by high temperature operation. Therefore, it is desirable to limit the time spent at higher temperatures and the amount of cycling during high temperature excursions. One approach to limiting negative effects from voltage cycling is to use voltage clipping. Voltage cycling may be considered benign below a certain voltage, to which the CSA is clipped. For example, at nominal operating temperatures, it may be acceptable to clip the voltage to a specified value but at higher operating temperatures the voltage clip may not be acceptable. Therefore, voltage clipping is not a complete solution.

SUMMARY

An exemplary method includes operating a fuel cell at a first power output level that includes a plurality of operation parameters. Each operation parameter has a value to satisfy a first power demand. A change between the first power demand and a second power demand is determined. At least a first one of the operation parameters is maintained at a value corresponding to the first power output level while at least a second one of the operation parameters is changed to a value corresponding to a second power output level to satisfy the second power demand. The first operation parameter is delayed from changing to a value corresponding to the second power output level until a predetermined criterion is met.

An exemplary fuel cell assembly includes a cell stack assembly and a controller configured to operate the cell stack assembly at a first power output level that includes a plurality of operation parameters. Each operation parameter has a value to satisfy a first power demand. The controller determines a change between the first power demand and a second power demand. The controller maintains at least a first one of the operation parameters at a value corresponding to the first power output level and changes at least a second one of the operation parameters to a value corresponding to a second power output level to satisfy the second power demand. The controller delays changing first operation parameter to a value corresponding to the second power output level until a predetermined criterion is met.

These and other features of the disclosed examples can be understood from the following description and the accompanying drawings, which can be briefly described as follows.

DETAILED DESCRIPTION

Figure 1:
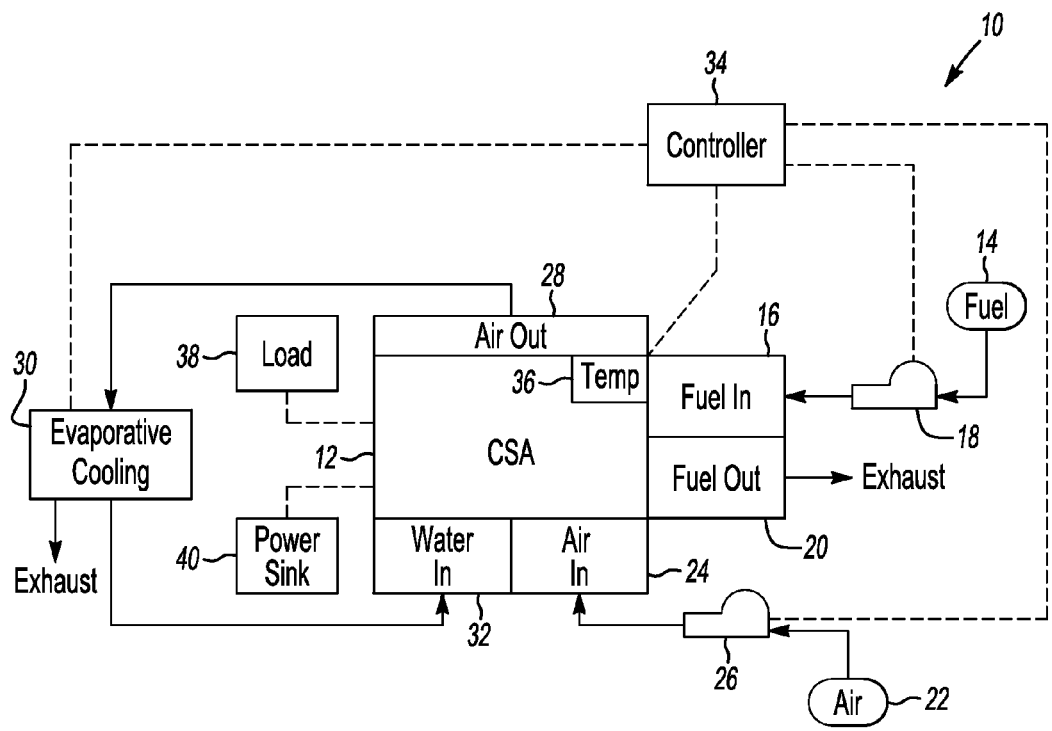
FIG. 1 schematically illustrates an example fuel cell assembly.

FIG. 1 schematically illustrates an example fuel cell assembly 10 including a cell stack assembly (CSA) 12 having a plurality of fuel cells. In this example embodiment, a fuel source 14 provides a reactant, such as hydrogen, which is directed to a fuel inlet 16 of the CSA 12 by a supply device 18 such as a fuel pump. The hydrogen (or another reactant) passes through the CSA 12 in a known manner to facilitate power generation. Exhaust fuel including hydrogen exits the CSA 12 through a fuel outlet 20.

An air source 22 provides air to an air inlet 24 driven by a supply device 26, such as a blower or compressor. The air (or another gas) passes through the CSA 12 in a known manner to facilitate power generation. Exhaust air exits the CSA 12 through an air outlet 28 and is directed to an evaporative cooling system 30. The evaporative cooling system 30 operates in a known manner and condenses water from the exhaust air, which is directed to the CSA 12 through a water inlet 32.

A controller 34 controls the fuel cell assembly 10 through communicating with the supply devices 18 and 26, the evaporative cooling system 30, the cell stack assembly 12, and a temperature sensor 36. Although the temperature sensor 36 is shown adjacent the CSA 12 in the illustrated example, the temperature sensor 36 could also be located remotely from the CSA 12.

Power generated by the CSA 12 is selectively directed by the controller 34 to a load 38 or a power sink 40, such as a battery, a capacitor, or a resistor.

Figure 2:
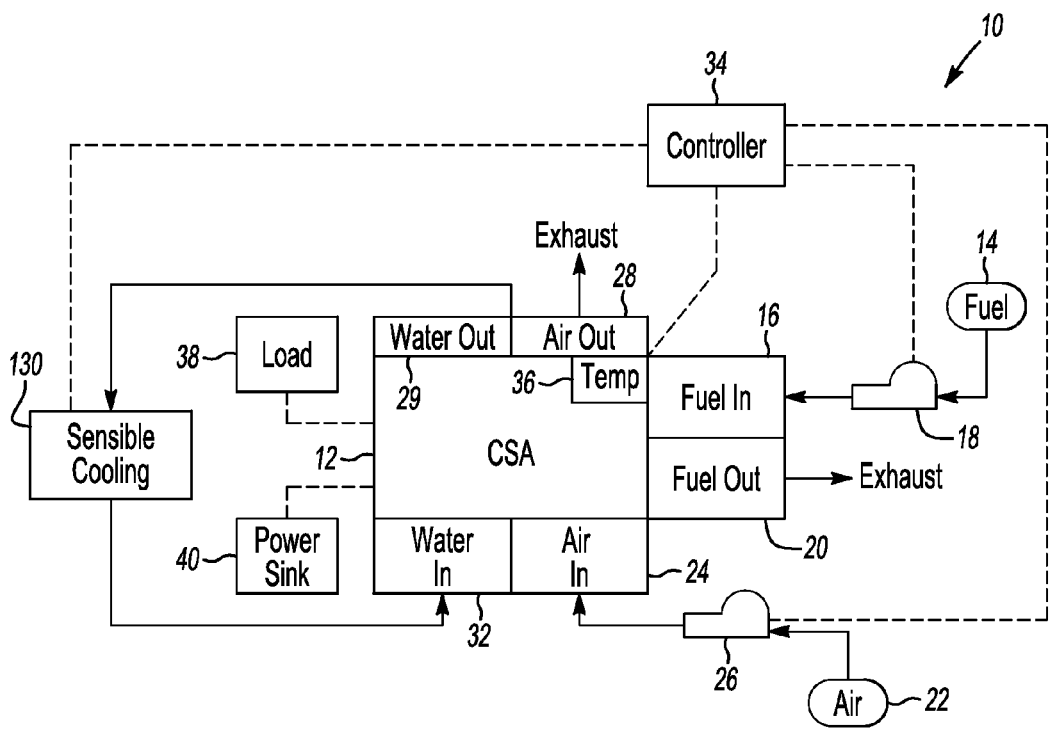
FIG. 2 schematically illustrates another example fuel cell assembly.

FIG. 2 schematically illustrates another example fuel cell assembly 10. In this example embodiment, water exits the CSA 12 through a water outlet 29 and is directed to a sensible cooling system 130 that operates in a known manner. The water returns to the CSA 12 though the water inlet 32 to cool the CSA 12 in a known manner.

Figure 3:
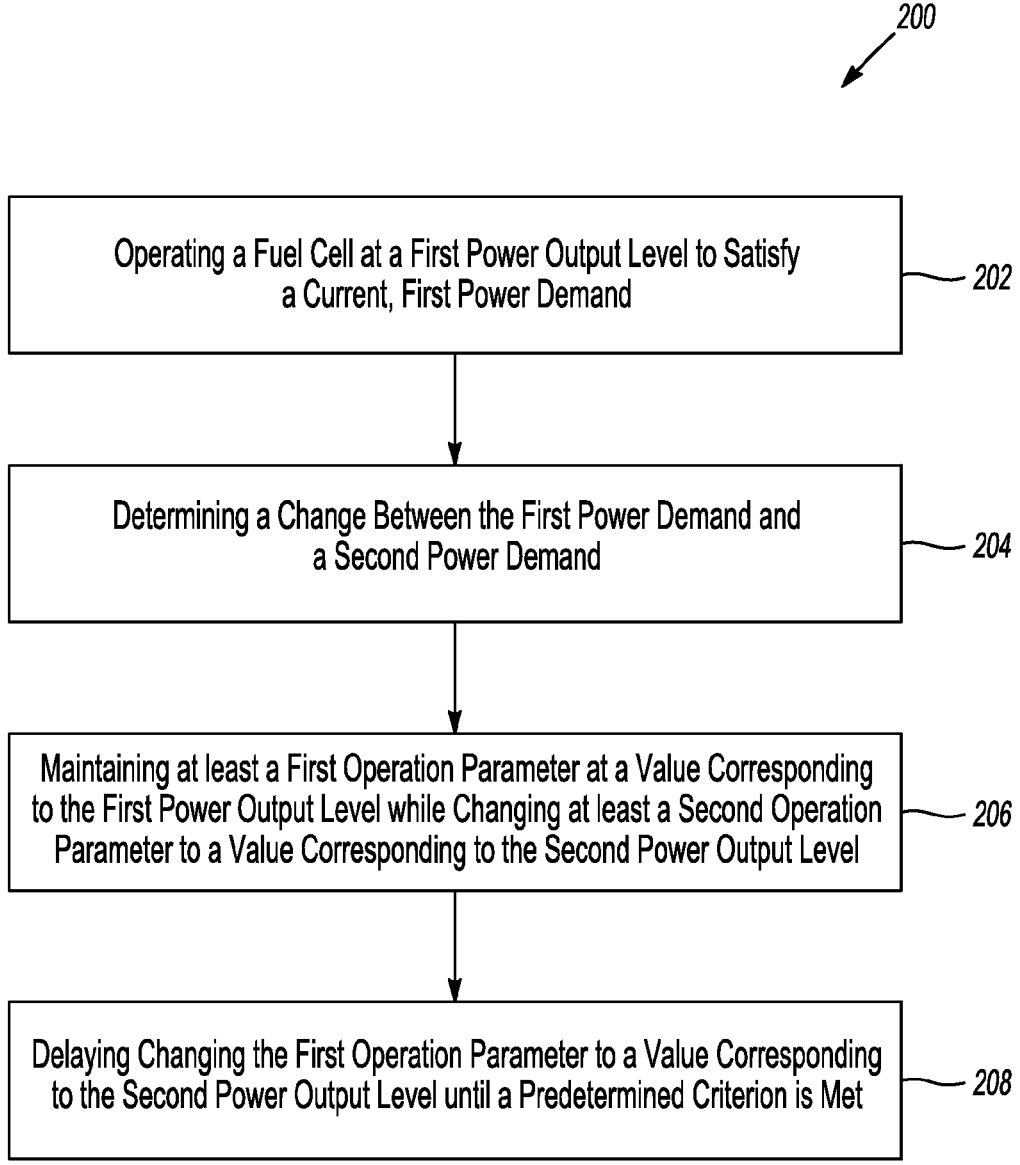
FIG. 3 is a flowchart that illustrates an example method of operating a fuel cell.

FIG. 3 is a flowchart diagram 200 that illustrates an example method of operating a fuel cell. The example method includes operating the fuel cell at a first power output level (step 202) that includes a plurality of operation parameters. Each operation parameter has a value that corresponds to the first power output level, which satisfies a current, first power demand. In this example, the operation parameters include at least one of CSA voltage, reactant flow rate, reactant pressure, and reactant humidity.

The controller 34 determines when a second power demand occurs such that there is a change between the first power demand and the second power demand (step 204).

At least a first one of the operation parameters is maintained at a value corresponding to the first power output level while at least a second one of the operation parameters is changed to a value corresponding to the second power output level (step 206). Rather than instantly changing all of the operation parameters to satisfy the second power demand, this example includes selectively delaying changing at least one of the operation parameters. This approach prevents cycling of CSA voltage, reactant flowrate, reactant pressure, and reactant humidity during high temperature excursions, which can reduce the lifespan of the fuel cell. This is particularly useful in situations where the power demand fluctuates repeatedly. If all operation parameters change immediately in response to a change in power demand, the cycling associated with those changes can have negative effects. However, if the CSA temperature is allowed to relax before detrimental cycling of the voltage or local membrane humidity occurs, the expected durability of the CSA can be extended.

One exemplary implementation occurs when the first power demand is greater than the second power demand. In certain instances of sustained operation at high power, the CSA makes an excursion to temperatures higher than normal due to the increased rate of heat production associated with high power operation. Additionally, during sustained high power operation, the temperature may be further increased by a required increase in reactant pressure, since the pressure required for sustained operation at high power may be higher than normal. In this case, as soon as power demand decreases, the reactant pressure should be decreased accordingly. This allows the CSA to begin cooling, or to cool more rapidly than if a higher pressure were maintained. However, although the pressure is immediately cut to a level corresponding to the second power demand, other parameters such as CSA voltage and reactant flow rate are either maintained at values corresponding to the first power demand, or changed to values corresponding to an intermediate between the first and second power demands.

In particular, while the CSA temperature is still higher than nominal, the voltage is clipped lower than nominal. In one example, the clip voltage is specified as a function of temperature. For example, if a cell voltage of 0.6V corresponds to the first power demand, and a cell voltage of 0.88V corresponds to the second power demand, the voltage may be clipped to a value lower than 0.88V, depending on the CSA temperature, until that temperature reaches a nominal temperature and the cell voltage is allowed to float to 0.88V. The clip voltage serves to avoid voltage cycling above a certain voltage, and clipping to a lower voltage when operating at higher temperature serves to mitigate even more cycling.

In one example, the clip voltage is the maximum voltage at which the CSA is allowed to operate. The clip voltage limits the minimum power draw and diverts excess power to a power sink whenever the power demand is below the minimum power draw. The clip voltage in one example decreases by 3 mV/cell for every 1° C. increase in temperature.

Additionally, while the CSA temperature is higher than nominal, the reactant flow rate may be set to an intermediate level between those corresponding to the first and second power demands, in an effort to maintain a steady balance between local evaporation and local water production, to avoid local membrane humidity cycling until the CSA temperature reaches its nominal range where such cycling is acceptable.

The membrane humidity may not be spatially uniform, but may vary at different points in the cell. The membrane humidity at a given location, or "local" membrane humidity, may also change with time as it responds to changes in the local water evaporation rate and water production rate. The local evaporation rate depends on the reactant flow rates, reactant humidity, and reactant pressures, while the local water production rate depends on the local ionic current density, which is related to the CSA current, voltage, and power. While local membrane humidity cycling may be acceptable at nominal temperatures, it may be mitigated during high temperature excursions by, for example, tuning the reactant flow rate and CSA current to maintain a steady balance between local evaporation and local water production.

In one example, the intermediate values for the reactant flow rates are chosen to maintain a steady balance between local evaporation (which depends on reactant flow rate, humidity, and pressure) and local water production (which depends on local current density, and in turn, on CSA voltage). Maintaining such a balance avoids local membrane humidity cycling while the CSA is still at a relatively high temperature. The controller 34 may implement a simple or complicated algorithm to determine the reactant flow rates required to maintain this balance.

In this particular example, the operation parameters that are not immediately changed or that are set to intermediate values include reactant flow and cathode potential. The operation parameters that are changed immediately (e.g., the "second" parameters), to correspond with the second power demand, include reactant pressure. Referring to FIGS. 1 and 2, the supply device 26 and fuel valve 18 reduce the reactant pressures to match the second power demand, while reactant flow rates, humidity, and CSA voltage remain unchanged or are temporarily set to intermediate values. Since the fuel cell is producing more power than is necessary to meet the second power demand, the excess power is directed to a power sink until the power output level matches the second power demand. The reduction in reactant pressure and, if applicable, the intermediate settings of the other operating parameters reduce the fuel cell operating temperature to a range where changes in reactant flow, humidity, and CSA voltage will be less detrimental to the durability of the fuel cell. Delaying large changes in at least one of reactant flow, humidity and CSA voltage until the temperature reaches a desired range avoids otherwise potentially detrimental effects. This example applies to fuel cells that utilize evaporative or sensible cooling systems 30, 130.

When the first power demand is less than the second power demand the operation parameters that remain at a value corresponding to the first power demand may include reactant pressure. The operation parameters that can be changed without delay in response to the increase in power demand include reactant flow rate, humidity and CSA voltage. In one example, the reactant pressure is maintained at a value corresponding to the first power demand, which prevents the CSA 12 from heating up as much as it would if the reactant pressure were increased. The reactant flow rate, humidity, and CSA voltage are changed without delay to a value corresponding to the second power output level to satisfy the second power demand. This example applies to fuel cells that utilize evaporative cooling systems 30.

The first one of the operation parameters is delayed from changing until a predetermined criterion is met (step 208). For example, the predetermined criterion includes a preset length of time and the controller delays changes to the first one of the operation parameters until the preset length of time passes. Avoiding frequent changes in response to frequent power demand changes decreases cycling which can be harmful to the fuel cell.

In another example, the predetermined criterion includes temperature of the cell stack assembly and the controller delays changes to the first one of the operation parameters until the cell stack assembly reaches a preset temperature as measured by the temperature sensor 36.

From the above discussion, it should be clear that in many cases, the change in power demand will be only temporary, and after a few seconds the power demand may revert from the second power demand back to the first power demand. In this case, the "first parameters" will not have changed to their "second" values, and will still be at their "first" values or intermediate values when the power demand reverts. If this is true, then in the example, where the second power demand is lower than the first, an entire detrimental cycle in voltage and in local membrane humidity will have been avoided, even though the power demand was cycled. In the example where the second power demand is higher than the first, the pressure will still be at its initial setting when the power demand reverts, so that the temporary temperature increase will have been lower than if the pressure had been increased. Thus, a potentially detrimental high temperature excursion will have been avoided or minimized.

Although preferred embodiments of this invention have been disclosed, a worker of ordinary skill in this art would recognize that certain modifications would come within the scope of this invention. For that reason, the following claims should be studied to determine the scope of legal protection provided to this invention.

We claim:

1. A method of operating a fuel cell, comprising:
    operating a fuel cell at a first power output level that includes a plurality of operation parameters, each operation parameter having a value corresponding to the first power output level to satisfy a first power demand;
    determining a change between the first power demand and a second power demand;
    maintaining at least a first one of the operation parameters at the value corresponding to the first power output level while changing at least a second one of the operation parameters to a value corresponding to a second power output level to satisfy the second power demand;
    delaying changing the first operation parameter to a value corresponding to the second power output level until a predetermined criterion is met;
    clipping a cell stack assembly voltage; and
    selecting a voltage value for the clipping based on temperature.

2. The method of claim 1, wherein the first power demand is greater than the second power demand.

3. The method of claim 2, wherein changing the second operation parameter comprises reducing fuel cell pressure.

4. The method of claim 2, wherein the first operation parameter includes at least one of reactant flow, humidity, or cell stack assembly voltage.

5. The method of claim 2, comprising changing the first operation parameter to a value corresponding to an intermediate power output level between the first and second power output levels.

6. The method of claim 1, wherein the first power demand is less than the second power demand.

7. The method of claim 6, wherein the first operation parameter is pressure.

8. The method of claim 1, wherein the predetermined criterion includes at least one of time and temperature of the fuel cell.

9. The method of claim 1, wherein maintaining at least a first one of the operation parameters at the value corresponding to the first power output level while changing at least a second one of the operation parameters to a value corresponding to a second power output level to satisfy the second power demand comprises directing excess power to a power sink when the first demand is greater than the second demand.

10. The method of claim 1, wherein the second operation parameter includes at least one of reactant flow, humidity, or cell stack assembly voltage.

11. The method of claim 1, comprising decreasing the voltage value for the clipping as the temperature increases.

12. A fuel cell assembly comprising:
    a cell stack assembly; and
    a controller configured to:
    operate the cell stack assembly at a first power output level that includes a plurality of operation parameters, each operation parameter having a value corresponding to a first power demand;
    determine a change between the first power demand and a second power demand;
    maintain at least a first one of the operation parameters at a value corresponding to the first power output level while changing at least a second one of the operation parameters to a value corresponding to a second power output level;
    delay a change in the first operation parameter to a value corresponding to the second power output level until a predetermined criterion is met;
    clip a cell stack assembly voltage; and
    select a clip voltage value based on temperature.

13. The fuel cell assembly of claim 12, wherein the first power demand is greater than the second power demand.

14. The fuel cell assembly of claim 13, wherein changing the second operation parameter comprises reducing a pressure of the cell stack assembly.

15. The fuel cell assembly of claim 13, wherein the first operation parameter includes at least one of reactant flow, humidity, or cell stack assembly voltage.

16. The fuel cell assembly of claim 13, wherein changing the first operation parameter to a value corresponding to an intermediate power output level between the first and second power output levels.

17. The fuel cell assembly of claim 12, wherein the first power demand is less than the second power demand.

18. The fuel cell assembly of claim 17, wherein the first operation parameter comprises pressure.

19. The fuel cell assembly of claim 12, wherein the second operation parameter includes at least one of reactant flow, humidity, or cell stack assembly voltage.

20. The fuel cell assembly of claim 12, wherein the predetermined criterion includes at least one of time and temperature of the cell stack assembly.

21. The fuel cell assembly of claim 12, wherein the controller is configured to direct excess power to a power sink when the first power demand is greater than the second power demand.

22. The fuel cell assembly of claim 21, wherein the power sink includes at least one of a battery, a capacitor, or a resistor.

23. The fuel cell assembly of claim 12, wherein the controller is configured to decrease the clip voltage value as the temperature increases.

* * * * *